US011857911B2

(12) United States Patent
Monereau et al.

(10) Patent No.: US 11,857,911 B2
(45) Date of Patent: Jan. 2, 2024

(54) ADSORBER WITH AT LEAST ONE CLUSTER COMPRISING A PLURALITY OF ADSORBENT MODULES

(71) Applicant: L'Air Liquide, Société Anonyme pour l'Etude et l'Exploitation des Procédés Georges Claude, Paris (FR)

(72) Inventors: Christian Monereau, Montpellier (FR); Benjamin Morineau, Kobe (JP); Guillaume Rodrigues, La Queue en Brie (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 584 days.

(21) Appl. No.: 16/979,279

(22) PCT Filed: Feb. 27, 2019

(86) PCT No.: PCT/FR2019/050442
§ 371 (c)(1),
(2) Date: Sep. 9, 2020

(87) PCT Pub. No.: WO2019/170978
PCT Pub. Date: Sep. 12, 2019

(65) Prior Publication Data
US 2020/0398212 A1      Dec. 24, 2020

(30) Foreign Application Priority Data

Mar. 9, 2018   (FR) ........................................ 1852051

(51) Int. Cl.
*B01D 53/04* (2006.01)
*B01D 53/047* (2006.01)

(52) U.S. Cl.
CPC ....... *B01D 53/0446* (2013.01); *B01D 53/047* (2013.01); *B01D 53/0423* (2013.01);
(Continued)

(58) Field of Classification Search
CPC ................ B01D 53/04; B01D 53/0446; B01D 53/0423; B01D 53/047; B01D 53/0462;
(Continued)

(56) References Cited

U.S. PATENT DOCUMENTS 2,083,732 A   6/1937   Moore et al.
2,753,950 A   7/1956   Baker et al.
(Continued)

FOREIGN PATENT DOCUMENTS

CA   2 510 863        12/2006
CN   204891534 U      12/2015
(Continued)

OTHER PUBLICATIONS

International Search Report and Written Opinion for corresponding PCT/FR2019/050442, dated Jul. 2, 2019.

*Primary Examiner* — Frank M Lawrence, Jr.
(74) *Attorney, Agent, or Firm* — Elwood L. Haynes

(57) ABSTRACT

A unit for purifying a gas mixture by adsorption, including at least one adsorber having at least one cluster of N identical adsorbent modules operating in parallel, where N≥2, each cluster of N adsorbent modules includes a common inlet manifold having a straight inlet duct of axis Xe supplying N inlet nozzles Tei, where i ranges from 1 to N, respectively connected to the inlets Ei, where i ranges from 1 to N, of the N modules of the cluster, a common outlet manifold having a straight outlet duct of axis Xs collecting the flow leaving the N outlet nozzles Tsi, where i ranges from 1 to N, respectively connected to the outlets Si, where i ranges from 1, of the N modules of the cluster.

2 Claims, 6 Drawing Sheets

(52) U.S. Cl.
CPC .. *B01D 2257/104* (2013.01); *B01D 2257/502* (2013.01); *B01D 2257/504* (2013.01); *B01D 2259/403* (2013.01); *B01D 2259/4062* (2013.01); *B01D 2259/4068* (2013.01)

(58) Field of Classification Search
CPC ........ B01D 2257/104; B01D 2257/502; B01D 2257/504; B01D 2259/403; B01D 2259/4062; B01D 2259/4068; Y02C 20/40
USPC .................. 95/96, 130, 139, 140; 96/121
See application file for complete search history.

(56) References Cited

U.S. PATENT DOCUMENTS

| | | |
|---|---|---|
| 4,971,609 A | 11/1990 | Pawlos |
| 11,148,093 B2 * | 10/2021 | Naito .................. B01D 53/047 |
| 2004/0083886 A1 * | 5/2004 | Phillips .................... A62B 7/14 |
| | | 95/138 |
| 2006/0243133 A1 * | 11/2006 | Hart .................... C01B 13/0259 |
| | | 95/26 |
| 2006/0288869 A1 | 12/2006 | Warren et al. |
| 2008/0289496 A1 * | 11/2008 | Poshusta ................ C10G 25/00 |
| | | 95/115 |
| 2013/0327216 A1 * | 12/2013 | Deckman ............. B01D 53/053 |
| | | 96/113 |
| 2014/0245890 A1 * | 9/2014 | Walker ............... B01D 53/0423 |
| | | 96/133 |
| 2015/0276066 A1 | 10/2015 | Tammera |
| 2017/0021302 A1 | 1/2017 | Galbraith et al. |

FOREIGN PATENT DOCUMENTS

| | | |
|---|---|---|
| CN | 106111360 A | 11/2016 |
| EP | 0 258 206 | 3/1988 |

* cited by examiner

ADSORBER WITH AT LEAST ONE CLUSTER COMPRISING A PLURALITY OF ADSORBENT MODULES

CROSS REFERENCE TO RELATED APPLICATIONS

This application is a 371 of International Application No. PCT/FR2019/050442, filed Feb. 27, 2019, which claims priority to French Patent Application No. 1852051, filed Mar. 9, 2018, the entire contents of which are incorporated herein by reference.

BACKGROUND

The present invention relates to a unit for purifying a gas mixture by adsorption comprising at least one adsorber comprising at least one cluster of N identical adsorbent modules operating in parallel.

Adsorption is widely used for purifying or separating gases. Mention may be made of the separation of n- and iso-paraffins, the separation of xylenes, of alcohols, the production of nitrogen or oxygen from atmospheric air, the capture of CO2 from combustion gas, blast furnace gas. On the purification side, there are the dryers, purification of hydrogen or of helium, purification of methane-rich gas, adsorption of trace impurities from numerous fluids (to stop mercury, NOx, sulfur-containing products, etc.).

The methods involving adsorption are of several types according to whether or not the adsorbent can be regenerated in situ Adsorption is therefore said to be of the "spent charge" type, meaning that the charge needs to be renewed when the product becomes saturated with impurities (the term "backup bed" is also used in this case to qualify such purification) or in the other case is referred to as adsorption cycles.

The adsorption cycles differ firstly in the way in which the adsorbent is regenerated. If the regeneration is performed essentially by increasing the temperature, then it is a temperature swing adsorption (TSA) process. If, on the other hand, the regeneration is performed through a drop in pressure, then it is a pressure swing adsorption (PSA) process.

Generally, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

- VSA processes, in which the adsorption is carried out substantially at atmospheric pressure, preferably between 0.95 and 1.25 bar abs, and the desorption pressure is lower than atmospheric pressure, typically from 50 to 400 mbar abs;
- MPSA or VPSA processes, in which the adsorption is carried out at a high pressure greater than atmospheric pressure, typically between 1.35 and 6 bar abs, and the desorption is carried out at a low pressure lower than atmospheric pressure, generally of between 200 and 650 mbar abs;
- PSA processes proper, in which the high pressure is substantially greater than atmospheric pressure, typically between 3 and 50 bar abs, and the low pressure is substantially equal to or greater than atmospheric pressure, generally between 1 and 9 bar abs;
- RPSA (Rapid PSA) processes, for which the duration of the pressure cycle is typically less than a minute;
- URPSA (Ultra Rapid PSA) processes, for which the duration of the pressure cycle is of the order of a maximum of a few seconds.

It should be noted that these various designations are not standardized and that, in particular, the indicated limits are subject to variation according to the authors.

In all these processes, the adsorbent is housed in a reservoir referred to as an adsorber. Various types of adsorbers are used, according to the flow rates involved or the local economic conditions: cylindrical adsorber with a vertical axis, cylindrical adsorber with a horizontal axis, radial adsorber, Collections of small or medium-sized vertical-axis cylindrical adsorbers are also used in parallel as a replacement for a larger single adsorber. Mention is then made of clusters (or groups), the basic element being a "small" adsorber comprising a shell ring containing an adsorbent, an inlet and an outlet and then being referred to as a module (or a subvolume), which are terms that will be reused hereinafter. In summary, in the context of the invention, a cluster may therefore be defined as being a collection of several modules. Note also that what is meant by "small adsorber" is an adsorber that has a diameter of 0.4 to 2.5 meters and a height of 0.4 to 5 meters, for volumes ranging from around 50 liters to 25 m$^3$.

The use of small adsorbers (modules) able to operate in parallel allows them to be produced in number at low cost. What is meant by "small adsorber" is an adsorber that has a diameter of 0.4 to 2.5 meters and a height of 0.4 to 5 m, for volumes ranging from around 50 liters to 25 m$^3$. It may appear to be paradoxical to seek to replace, for example, an adsorber of volume V by 4 adsorbers of volume V/4, but a detailed analysis of the ultimate cost price is able to explain this. In addition to the mass-production effect—which is more significant than it might appear here, and which will be returned to later —, the relative cost of equity, handling and, more generally, manufacture which become easier, transportation, and the fact that a greater number of facilities, which are equipped to be able to manufacture equipment of medium size, are able to compete for the work, all means that in a certain number of cases at least, the cluster solution is the one imposed.

Nevertheless, it will be appreciated that the use of N modules in parallel in place of one single adsorber presents a new problem: that of correct distribution of the fluids between the various modules that in theory are supposed to operate identically.

It should be noted that it is relatively easy to correctly distribute a fluid between several identical modules, and also more generally between identical equipment (tubes, exchangers, filters, etc.) either by using a sufficiently large distribution volume, or by employing the same restriction on all the circuits in parallel, thus creating a head-loss that is markedly greater than the differences in pressure that there might be from one circuit to another, or finally, if the circuits are balanced using suitable devices, for example valves, FIG. 1 illustrates this idea.

Graph 1.a depicts a manifold 1 supplying the fluid 4 to the 3 subvolumes 10, 20, 30, via 3 identical pipes 11, 21, 31. It is known that if the speed of the fluid in the manifold 1 is low enough, the entire manifold 1 can be considered to be at the same pressure, namely in practice that the pressure variations caused both by friction and by the variations in speed after each branch (11, 21) are negligible in comparison with the other pressure variations in the system considered. In that way, the sub-flowrates 4.1, 4.2 and 4.3 may be identical and each equal to one third of the flow rate of the fluid 4. It will also be noted that this system does not add drops of pressure head to the unit and that, rather, because of the generously sized manifold, it minimizes these.

Graph 1.*b* illustrates another conventional solution. Because of the higher speed in the manifold, this manifold is no longer all at the same pressure but experiences the changes in pressure caused by friction and by the variations in speed after each branch, where respectively V1>V2>V3. In order to give a more tangible idea of things, at the scale of the graphs, the factor of 2 between the diameters of the manifold in graph 1.*a* and the manifold in graph 1.*b* leads to a factor of 4 with regard to the cross section and therefore speeds, which will itself lead, to a first approximation, to a factor of 16 with regard to the variations in pressure, for the same flow rate. In this case, the solution for obtaining a good distribution of the fluid between the modules 10, 20 and 30 in spite of all this is to add a significant head-loss DP for example by using an identical calibrated orifice referenced 13, 23, 33 to the branches 11, 21 and 31 respectively. As long as this head-loss DP is large in comparison with the pressure variations in the manifold, the difference between the sub-flowrates 4.1, 4.2 and 4.3 can be made as small as is wished. In practice, it is the calibrated orifice alone which distributes the flows equitably between the various circuits. This principle is known and very widely used in industry (injection nozzles, distributors with low levels of perforation, calibrated orifice, etc.).

These 2 solutions are not very expensive in terms of investment (increasing the diameter of the manifolds, adding calibrated orifices) and may potentially be combined in order to seek the economic optimum. In that case, what will be adopted for example will be a manifold of an intermediate size, making it possible to reduce the head-loss of the calibrated orifice.

These solutions are also currently used in adsorption processes, especially since the additional common head-loss, represented here by a calibrated orifice (13, 23, 33), can be used to distribute the fluid within the module, for example via a distributor with a low level of perforation, which will also perform the dual function of distributing the gas between modules and into the adsorbent mass of each module.

However, the counterpart to this, namely the increase in volume of the manifolds as in graph 1.*a* and/or the addition of a head-loss as in graph 1.*b*, may in certain processes have a very significant negative effect on performance. These points will be returned to later. It may however be noted immediately that when a cluster of modules is used to replace a single adsorber, the valves associated with the process that allow the adopted pressure cycle and the corresponding gaseous exchanges to be performed are situated, on the inlet side, on the common inlet manifold, upstream of the N manifolds extending toward the N modules and likewise, on the outlet side, on the common outlet manifold, downstream of the N outlet manifolds leading from the N modules. As a result, all the manifolds connected to the modules form an integral part of the equivalent adsorber formed by the modules of the cluster. This point is illustrated by FIG. 2.

That figure schematically depicts a unit of VSA or VPSA type comprising 2 adsorbers 2 and 3 operating with a phase shift. The unit is supplied with a charge gas 1 at atmospheric pressure or at a pressure of a few bar. This gas is separated into two fractions: the fraction 4 which contains the less adsorbable compounds, and the fraction 5 which contains the more adsorbable constituents and which is extracted via the vacuum pump 6. The adsorber 3 has been depicted in the form of 6 identical modules 3.1 to 3.6, whereas the adsorber 2 has been depicted only in an overall form, by way of comparison. The correct running of the cycle envisioned here requires the valves 12 and 13 on the supply side, 32 and 33 for extracting the fraction 5, 22 and 23 on the side concerned with the production of the fluid 4, and the valve 24 for transfers between adsorbers 2 and 3.

The manifolds 7 and 8 are situated between the process valves and form an integral part of the adsorber. In particular, they experience the same pressure variations as the adsorbent, and are therefore pressurized or depressurized in the same way thereas. In the case of the adsorber 3, in addition to the manifolds 7 and 8, it is necessary to account for the inlet nozzles of each module, namely 7.1 to 7.6, and the outlet nozzles 8.1 to 8.6. It will be appreciated that the dead volumes of the adsorber 3 may be vastly greater than those of the adsorber 2. This will be particularly true if there is a desire to distribute the various flows identically between the 6 modules while limiting the drops in pressure head in the common manifolds 7 and 8 of the adsorber 3. In practice, the volume of the manifolds of the adsorber 3, in such a configuration, may be approximately one order of magnitude higher than the manifold of a single adsorber, like the representation of the adsorber 2, which contains the same overall volume of adsorbent, might have. The feed gas contained in this manifold at the end of the adsorption step will to a large extent be lost, which means to say that it will be pumped out and will depart with the fluid 5. This has a number of negative consequences: if the production being put to profitable use is the fraction 4, this will lead to a drop in extraction profitability because, as has just been explained, this part of the feed gas is not processed by the adsorbent but is discharged directly, and there will be an increase in energy consumption because this fraction is compressed in the vacuum pump 6. If the fraction being put to profitable use is the fraction 5, the feed gas with its less adsorbable constituents will contaminate the production and this additional gas, as has just been seen, also needs to be compressed. If both fractions 4 and 5 are to be put to profitable use, then these 2 disadvantages become cumulative.

In general, these volumes associated with the adsorbers but which do not play a direct part in the separation are referred to as "dead" volumes, as opposed to the active volumes or volumes of adsorbent. The manifolds often represent only a small proportion of these dead volumes, say 10% to 35% of the total dead volumes, the majority of these volumes generally lying inside the adsorber itself. In the system as described above, there will generally be the inverse phenomenon and these dead volumes associated with the manifolds may become predominant and have a highly significant negative influence on performance. It may also be noted in passing that the dead volumes associated with the manifolds are essentially dependent on the throughput processed by the adsorption unit whereas the volume of adsorbent installed is itself dependent on the quantity of gas to be processed per cycle, which of course means on the feed rate but also directly on the cycle time and more particularly on the adsorption time. It is known that one of the strong trends in the sizing of units of PSA type is to reduce the cycle time in order to minimize the quantity of adsorbent to be used, and therefore the investment. It may be recalled that the solution that consists in enlarging the manifolds in order to achieve good distribution of the fluids across the various modules is difficult to apply to PSA, especially when the cycles used are short.

In the same way, it can be demonstrated that the solution that consists in adding calibrated orifices, or the equivalent, in order to balance the flow rates between modules is not always applicable. Specifically, a person skilled in the art is aware that a given head-loss does not have the same energy impact according to the pressure of the fluid. The lower the pressure, the greater this impact. The energy cost corresponding to an additional head-loss of 50 mbar, for example, created in a fluid circulating either at a pressure of 1 bar abs or at a pressure of 30 bar abs can be estimated by comparing the compression energies lost in both instances, namely respectively from 1.0 to 0.95 and from 30 to 29.95 bar abs. A factor of the order of 30 is obtained. In the case of FIG. 2, the gas adsorbed is extracted by a vacuum pump. In this type of process, use is generally made of machines of the Roots type, the volumetric flow rate of which is constant to a first approximation and the compression energy of which is proportional to the pressure difference between the upstream and downstream sides of the pump. A typical end-of-pumping pressure is of the order of 400 mbar with therefore an energy at this point that is proportional to 1000-400=600 mbar, assuming, as is generally the case, that this vacuum pump is able to lift to atmospheric pressure. Introducing a head-loss of 50 mbar measured at atmospheric pressure into the discharge circuit of the modules is going to penalize pumping throughout the step. It will be noted that, bearing in mind the choice of the machine, this head-loss will change, to a first approximation, in the same way as the suction pressure of the vacuum pump. The difference will be very significant at the start of pumping where the vacuum pump will be operating for example from 0.905 to 1 bar rather than 0.95 to 1.0 bar abs, and at the end of the step the suction pressure will need to be lowered to 380 mbar if the adsorbent is to be regenerated under the pressure conditions adopted during the rating process. At this point, the pump will then have to lift the pressure to 620 mbar, rather than 600, leading to additional consumption, minimal at this point, but still a little in excess of 3%. In order to pump the same quantity of gas, the machine will need to be approximately 5% larger. The process is therefore penalized both in terms of energy and in terms of investment.

The addition of a loss in pressure head in order to ensure good distribution is not generally applied to low-pressure adsorption processes, particularly if they include a vacuum regeneration step. However, one or another of the solutions described (enlargement of the manifolds, addition of a calibrated orifice, etc.) may prove to be the best solution in the case of a backup bed, of a unit of the TSA type with relatively long cycle times (for example in excess of 1 hour) or in the case of units operating under pressure like certain units employed for drying/removing carbon from syngas, where adsorption and regeneration take place at over 10 bar, or even over 20 bar abs.

However, from the foregoing, it is nevertheless clear that there is a need to find a means other than enlarging the manifolds and/or adding significant drops in pressure head when modules are to be used in a cluster in an adsorption process of the low pressure PSA type, particularly of the VPSA type, namely in which the adsorbent is regenerated under vacuum, especially since the cycles used are going to be short.

SUMMARY

A solution of the present invention is a unit for purifying a gas mixture by adsorption comprising at least one adsorber comprising at least one cluster of N identical adsorbent modules operating in parallel, where N≥2, each cluster of N adsorbent modules comprising:

- a common inlet manifold comprising a straight inlet duct of axis Xe supplying N inlet nozzles Tei, where i ranges from 1 to N, respectively connected to the inlets Ei, where i ranges from 1 to N, of the N modules of said cluster,
- a common outlet manifold comprising a straight outlet duct of axis Xs collecting the flow leaving the N outlet nozzles Tsi, where i ranges from 1 to N, respectively connected to the outlets Si, where i ranges from 1, of the N modules of said cluster, characterized in that:
- the axes Xe and Xs are substantially coincident,
- the N inlets Ei of the N modules are substantially situated on a first circle centered on the axis Xe or Xs,
- the N outlets Si of the N modules are substantially situated on a second circle centered on the axis Xe or Xs,
- the N inlet nozzles Tei are of substantially identical geometries, and
- the N outlet nozzles Tsi are of substantially identical geometries.

As a preference, the inlet manifold will comprise a separation piece between the straight inlet duct and the inlet nozzles. Likewise, the outlet manifold will comprise a collecting piece between the outlet nozzles and the straight outlet duct.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF THE PREFERRED EMBODIMENTS

Figure 1A:
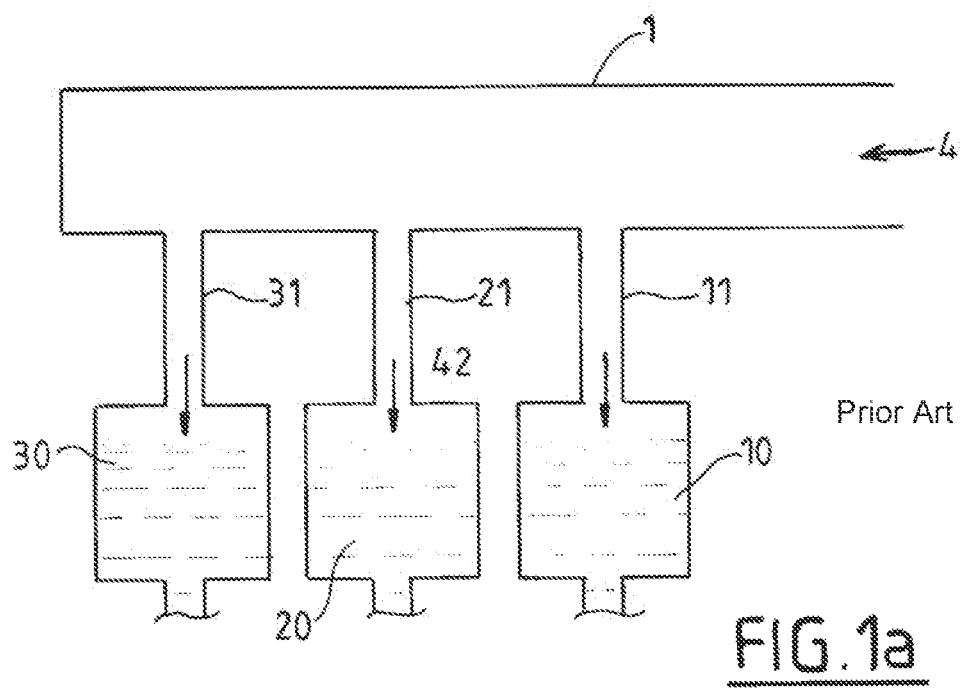
FIG. 1a is a schematic representation of N modules operating in parallel, as known to the art.
Figure 1B:
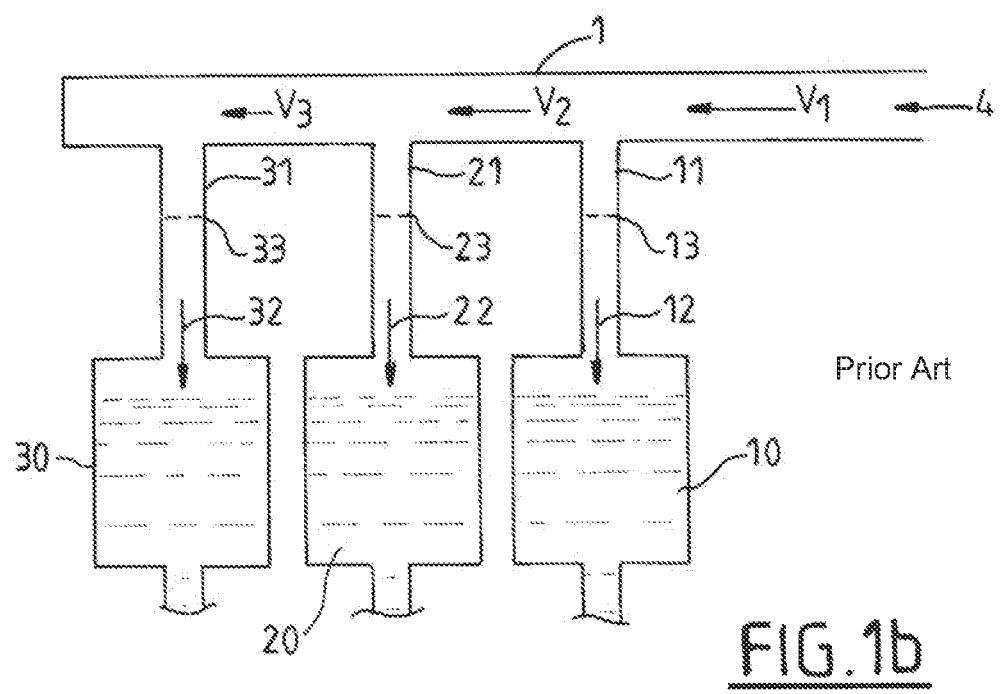
FIG. 1b is another schematic representation of N modules operating in parallel, as known to the art.
Figure 2:
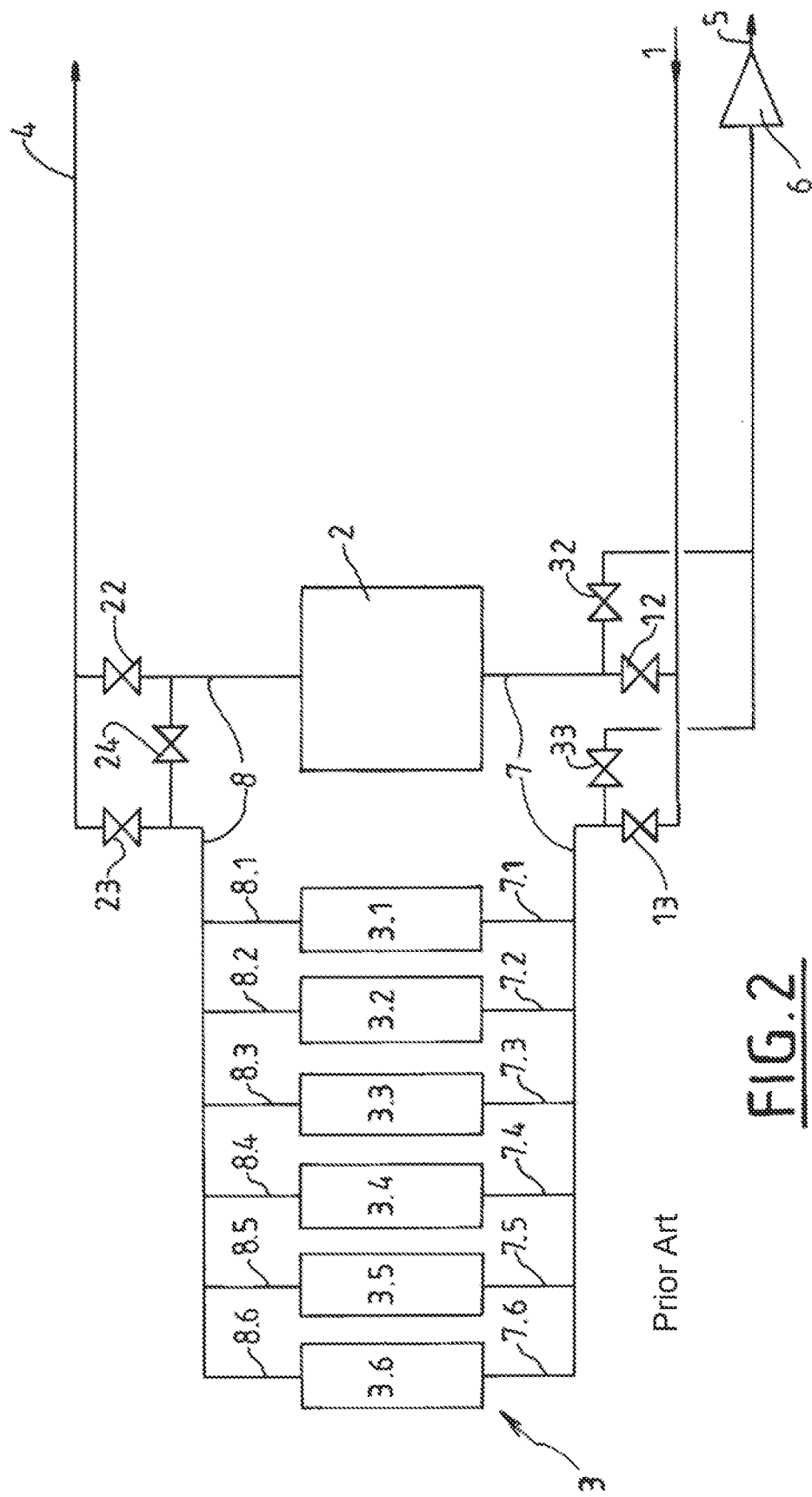
FIG. 2 is a schematic representation of N modules operating in parallel, with the aid of a vacuum pump, as known to the art.
Figure 3:
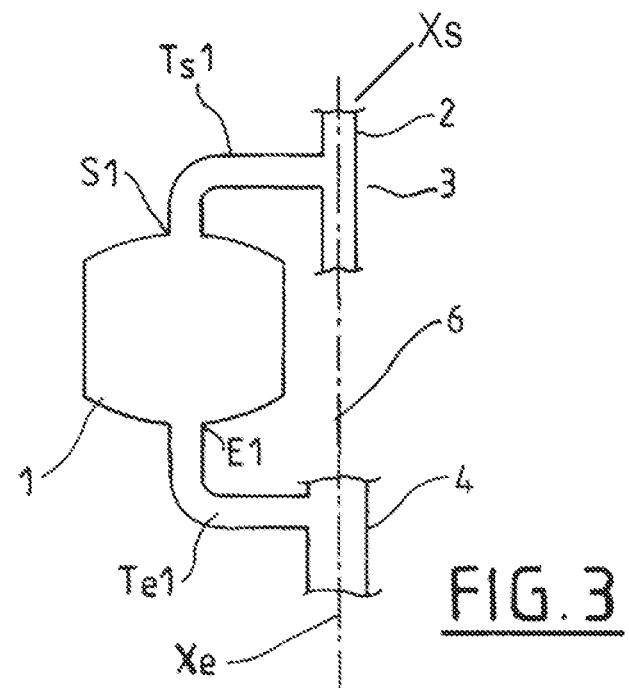
FIG. 3 is a schematic representation in accordance with one embodiment of the present invention.
Figure 4:
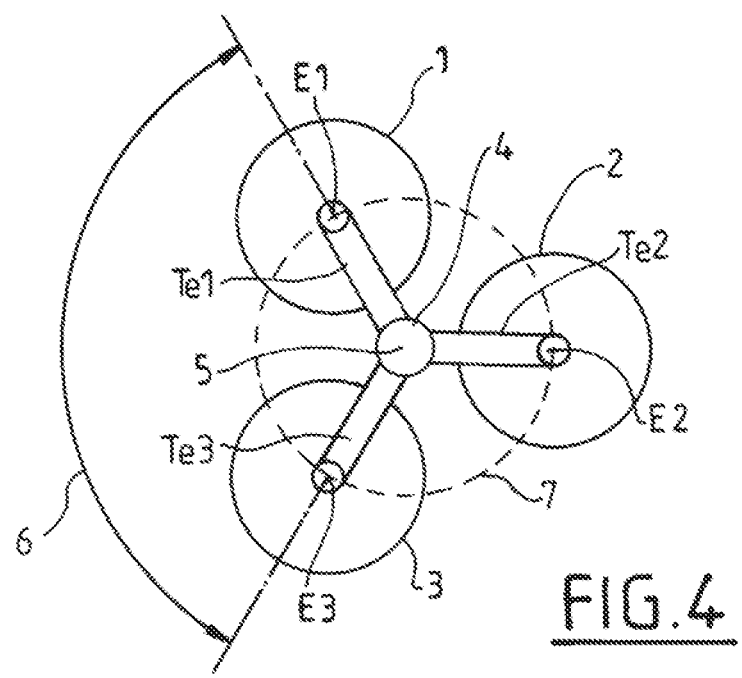
FIG. 4 is a schematic representation of a view from beneath, in accordance with another embodiment of the present invention.

FIGS. 3 and 4 schematically illustrate the principles of the invention, for a simple case. FIG. 3 depicts just one module 1 of the cluster of 3 modules that make up one of the two adsorbers of the PSA unit. Its inlet E1, in the lower part, is connected to the common inlet manifold of axis Xe via the inlet nozzle Te1. Its outlet S1, in the upper part, is connected to the outlet manifold of axis Xs via the outlet nozzle Ts1 According to the invention, the axes Xe and Xs are coincident to form the single axis 6 and, on the one hand, the 3 inlet nozzles and, on the other hand, the 3 outlet nozzles are geometrically identical to those depicted in FIG. 3 (straight length, bend, straight length).

FIG. 4 is a view from beneath of the cluster of 3 modules (1, 2, 3) that make up one of the adsorbers of the PSA unit. The inlets of the modules are now identified (E1, E2, E3), and the inlet nozzles (Te1, Te2, Te3). According to the invention, the 3 inlets (E1, E2, E3) lie on the circle (7). It will be noted that, according to a preferred variant of the invention, the angles between the inlet nozzles (the angle identified (6) between the modules 1 and 3) each measure approximately 120°.

The word "substantially" used to define the alignment of the axes of the manifolds, of the position of the inlets and outlets of the modules, of the identical geometry of the nozzles, means in this instance "to within the usual production tolerances". These tolerances cover both the construction of the various elements, their installation and connection on site, and the small modifications that may occur when the unit is in operation (under the effect of temperature, pressure, stress, etc.). The tolerances envisioned here are the normal tolerances corresponding to this type of unit. Thus, for example, the axes Xe and Xs could be not entirely vertical as depicted, but differ from the vertical by a few degrees. With respect to a "substantially" common vertical axis, the respective centers of the common inlet and outlet manifolds could be distant by, for example, one centimeter. What that means to say is that the unit is produced according to the rules of the art that are conventional for an industrial unit without the addition of additional constraints that might potentially improve the distribution of the fluids in the various modules operating in parallel but would increase the cost of embodiment and/or render same more difficult.

It will be noted that the center of the generally circular orifice via which the fluids enter and leave the module is referred to here as "inlet" and "outlet" of the module.

When N is greater than 4 or than 6, intermediate groupings of N/2 or N/3, etc. modules may potentially be made, and these subsets then collected together. Nevertheless, that increases the complexity of the distribution system by introducing more resistances (elbows, tees, connectors), causing more head-losses, more dead volumes and increasing the risk of poor distribution between modules. For these reasons, the installation described hereinabove is favored.

As the case may be, the method according to the invention can exhibit one or more of the features below:
the length of the straight inlet duct is greater than 3 times its diameter, preferably than 5 times its diameter;
the length of the straight outlet duct is greater than 3 times its diameter, preferably than 5 times its diameter; this feature together with the previous one make it possible to have stream lines that are approximately uniform and parallel to the wall at the point at which streams diverge or come together so that no module is favored by, for example, the presence of an elbow or of a tee too close to this zone. If a great deal of attention is not paid to this point, major defects in the distribution between modules may result;
the straight inlet duct and/or the straight outlet duct comprises within it a system for evening out the circulation of the gas mixture that is to be purified or that has been purified; this makes it possible to obtain uniform flow through the common manifolds in the collecting (separation, coming-together) zones of the nozzles. The use of this device will become essential when, by construction, it is impossible to obtain a sufficient straight length, which is to say a length equal to several times the diameter, of the common manifold, or when, because of other unavoidable spreads in other portions of the piping, there is a desire to have near-perfect distribution, for example distribution to within + or −0.5%, or even of the order of 0.25%, at this point. There are several devices available for this purpose, such as one, or preferably 2 or 3, plates extensively perforated with a number and diameter of holes suited to the operating conditions. However, other types of device will be given greater preference. Thus, the benefit of a system of the static mixer or packing type is that it is both effective and creates practically no head-losses.

It will be duly noted that this is a fixed device installed inside the common manifolds rather than an adjustable system installed at the nozzles of each module. The sole purpose of the device in question is to get as close as possible, respectively upstream on the inlet side and downstream on the outlet side, to the velocity profile that characterizes a fluid flowing in steady-state along a straight length of piping.
the evening-out system is a static mixer or a mixer of the cross packing type.
the first circle and the second circle have substantially identical radii. This embodiment will be very widely adopted when the adsorbent is in the form of particles. It minimizes the risk of bypassing and makes it possible to obtain very uniform interfaces between adsorbents or between adsorbent and support. In the case of monoliths and more generally of contactors with parallel passages, other installations, such as a horizontal or angled arrangement, are possible and the inlets and outlets may lie on circles of different radii. It will be recalled that what is meant here by inlet and outlet is the center of the inlet and outlet orifices of the modules.
the connections of the inlet nozzles Tei, where i ranges from 1 to N, of the N modules to the straight inlet duct of the common inlet manifold are spaced apart by an angle of approximately 360/N degrees.
the connections of the inlet nozzles Tei, where i ranges from 1 to N, of the modules to the straight inlet duct of the common inlet manifold are spaced apart by an angle of approximately 360/N degrees. This feature, together with the previous one, once again makes it possible to encourage the symmetry of the nozzle collecting assemblies. Such a spatial distribution is not compulsory if the consequence of another arrangement can be calculated, for example using fluid mechanics, and this consequence can be incorporated into the distribution calculations. Nevertheless, a nozzle distribution like the one recommended will be preferable wherever possible because it allows the overall system to be optimized as far as possible by limiting the presence of defects in the places where defects are almost inevitable (welds, etc.).
each adsorber comprises a cluster of 2 to 12 identical modules operating in parallel, preferably of 3 to 6 identical modules operating in parallel.
each adsorber comprises 2 to 5 clusters of 2 to 12 modules operating in parallel, preferably of 3 to 6 modules operating in parallel, with all of the modules of the unit being identical. Note that the clusters of N modules have similar geometries. Specifically, the differences between the adsorbers will lie solely in the installation and orientation of the various modules from one adsorber to another.

said unit is a unit of the O2 VSA or O2 MPSA type comprising 1 to 4 adsorbers comprising 1 to 4 clusters of 3 to 6 modules.

said unit is a unit of the CO2 VSA, CO2 MPSA or CO2 PSA type comprising 1 to 12 adsorbers comprising 1 to 6 clusters of 2 to 8 modules.

said unit is a unit of the CO2 VSA or CO2 MPSA type comprising 1 to 8 adsorbers comprising 1 to 4 clusters of 3 to 6 modules.

the N modules each comprise a volume of adsorbent of between 50 liters and 25 m3.

As explained above, according to one preferred embodiment, the unit employs a plurality M of adsorbers (M= or >1), each of these adsorbers being made up of a cluster comprising from 2 to 12, preferably from 2 to 6, identical modules operating in parallel. Upwards of 6 modules, installing them symmetrically may require more space than is available and lengthen the nozzles. It may therefore prove advantageous to replace a large-sized adsorber with several clusters of a few modules each rather than employing one cluster comprising an excessive number of modules. In that case, preference will be given to clusters comprising an identical number of modules.

In the case of PSA units processing high throughputs, use will therefore be made of a variant employing a plurality M of adsorbers (M= or >1), each of these adsorbers being made up of K clusters, where K is preferably comprised between 2 and 5, each comprising N identical modules, N preferably being comprised between 3 and 6, all operating in parallel. With such a layout, it is possible to cover a broad range of throughputs.

In such a configuration, namely a PSA unit comprising a plurality M of adsorbers, each of these adsorbers being made up of a plurality K of clusters of N identical modules operating in parallel, the K inlet manifolds of the clusters are connected to the main inlet manifold of the adsorber made up of these K clusters, and the K outlet manifolds of the clusters are connected to the main outlet manifold of that same adsorber.

Figure 5:
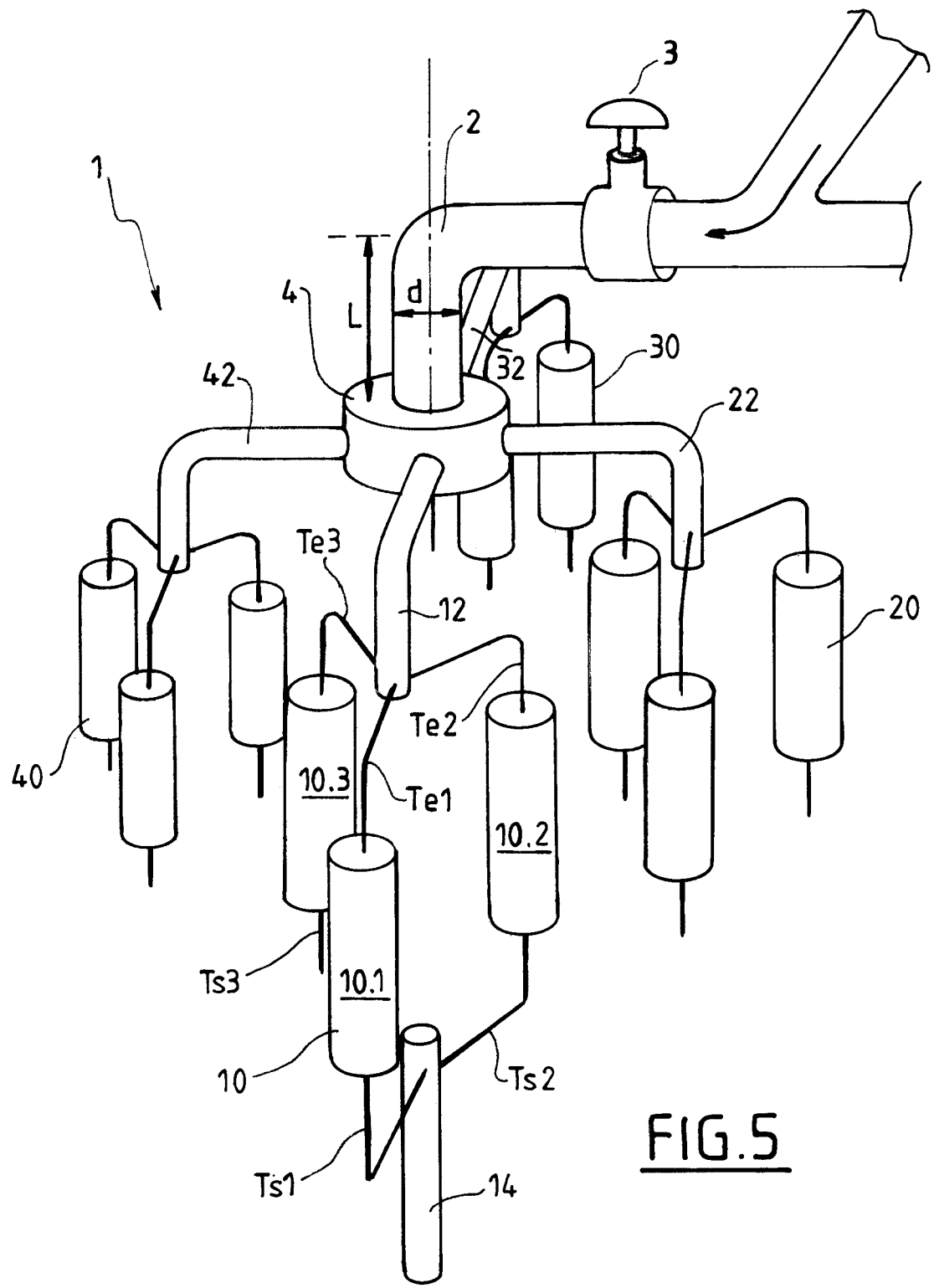
FIG. 5 is a schematic representation of an adsorber formed of 4 clusters of 3 identical modules, in accordance with one embodiment of the present invention.

FIG. 5 illustrates such an installation in the event that each adsorber is formed of 4 clusters of 3 identical modules, Only the first adsorber is depicted, and is depicted incompletely, in order to avoid overloading the figure. The adsorber 1 is therefore made up of the clusters referenced 10, 20, 30 and 40. Each cluster comprises 3 modules such as 10.1, 10.2, 10.3 in the case of the cluster 10. Each cluster has its inlet manifold (12, 22, 32, 42) and its outlet manifold (14, ... ). The inlet nozzles of each module of the cluster 10, namely the nozzles Te1, Te2 and Te3, meet at the manifold 12. The same is true on the outlet side with the nozzles Ts1, Ts2 and Ts3, and the common manifold 14. The 4 inlet manifolds of the 4 clusters are connected to the separation piece 4 situated at the end of the straight inlet duct of the inlet manifold 2 of the adsorber 1. The valve 3 situated on this manifold allows the pressure cycle to be performed. All of the pipework downstream of this valve, including the distribution piece 4, therefore forms part of the dead volumes on the supply side. The system of grouping together the outlets of the modules and of the clusters, which is depicted very partially, is similar to the system employed on the inlet side.

As depicted in FIG. 5, measures will be taken to ensure that the flow rates of the gas flows heading toward or coming from the K clusters via the common inlet and outlet manifolds are rendered very substantially equal by having this piping follow an equivalent geometric line. In practice, the same type of rules as for the distribution between modules of the one same cluster will be applied. The collecting piece 5 (not depicted) that collects together the outlet manifolds of the 4 clusters, which is equivalent to the piece 4 on the inlet side, will have the same axis 2 as this inlet piece. In order for the flow regime to be uniform, straight lengths L that are sufficiently long, namely of a length equal to at least 3 times the diameter d, preferably to 5 times the diameter d, will be provided. If necessary, use will be made in these sections of piping of a system which eliminates flow distortions associated with the presence of elbows, tees and, more generally, any obstacle encountered by the fluid.

It will be appreciated that, for the sake of simplicity and symmetry, in a pressure swing adsorption unit comprising a plurality M of adsorbers (M= or >1), each of these adsorbers being made up of a plurality (K, K= or >1) of clusters each comprising N (N= or >2) modules, the M*K clusters constituting said unit have a geometric configuration that is essentially identical, although the orientation in space of these clusters may itself differ.

It will be noted that, here too, there are other ways of combining the manifolds of the 4 clusters symmetrically. The manifolds of 2 clusters can be first of all connected to an intermediate manifold, and the same thing done for the 2 other clusters. The 2 intermediate manifolds are then connected to the common manifold of the adsorber, Just as with the modules, such an installation is not desirable because of the additional volumes and head-losses, but it may be rendered necessary by installation constraints, for example the width available not allowing a circular setup on this scale.

The principle of the invention will now be explained in terms of its application to a unit for producing oxygen from atmospheric air using a process of the MPSA type with a high pressure of 1.55 bar abs and a low pressure of 0.47 bar abs. The 2-adsorber cycle comprises a step of producing oxygen at increasing pressure of around 1.4 to 1.55 bar abs, a co-current decompression step, a co-current decompression step with simultaneous countercurrent pumping, a countercurrent pumping step, two steps of elution with production gas and with the gas derived from decompression, a repressurization step with, simultaneously, co-current atmospheric air and gas derived from decompression, a final recompression with air and possibly with oxygen. The total cycle time is 38 seconds give or take 3 seconds according to the particular conditions on the site. The reservoirs (modules) used are all identical with a cylindrical shell ring with a diameter of 2100 mm, and a height of 1300 mm. The unit considered by way of example is a unit of medium size, each adsorber being made up of a single cluster of 3 modules. The production of oxygen ranges from around 33 to a little over 40 tonnes per day depending on the desired purity (from 90 to 93.5 mol %), the choice of machines, of adsorbents and the local conditions (temperature, humidity, altitude, etc.). The choice of machines and of adsorbent is an essentially economic choice based on the trade-off between investment and energy consumption. From the inlet to the outlet, in the direction in which air is supplied toward the oxygen outlet, each module comprises an inlet opening connected to the inlet nozzle, a flow splitter of the spherical cap type or of cylindrical shape, which is very highly perforated and acts as a deflector, a bed of inert particles of diameter 25 or 40 mm allowing the fluid to spread uniformly over the entire cross section of the adsorber, the adsorbent material, a system that makes it possible to reduce the dead volumes in the upper part and serves to maintain the bed, a second flow splitter/manifold and an outlet opening connected to the outlet nozzle. The adsorbent material consists, from the inlet toward the outlet, of one or two layers of adsorbent serving to stop most of the moisture, the CO2 and the atmospheric pollutants, a layer of zeolite serving both to capture the very last traces of impurities and contributing to the O2/N2 separation and one or two layers of lithium-exchanged zeolite suited to O2/N2 separation. Phase change materials may be added to all or some of the zeolite beds. It will be pointed out in this regard that an additional benefit connected with the use of axial adsorbers rather than radial adsorbers is the greater ease with which several layers of different adsorbents can be employed, these in this instance simply having to be superposed when packing the bed. Each of the adsorbents selected is closely specified with its supplier in order to obtain products of which the characteristics remain constant over time. This is particularly the case with particle size, density and adsorption characteristics. The modules are packed in the workshop with special tooling and detailed protocols. In this way, differences between the modules of one same unit are minimized. The manufacturing tolerances are the standard tolerances for this type of construction, namely of the order of a few millimeters. These tolerances have no impact on the performance of the modules. In practice, they are smaller than may be encountered with radial adsorbers where a lack of concentricity and longitudinal flexing of the gratings may introduce somewhat more significant effects.

Figure 6:
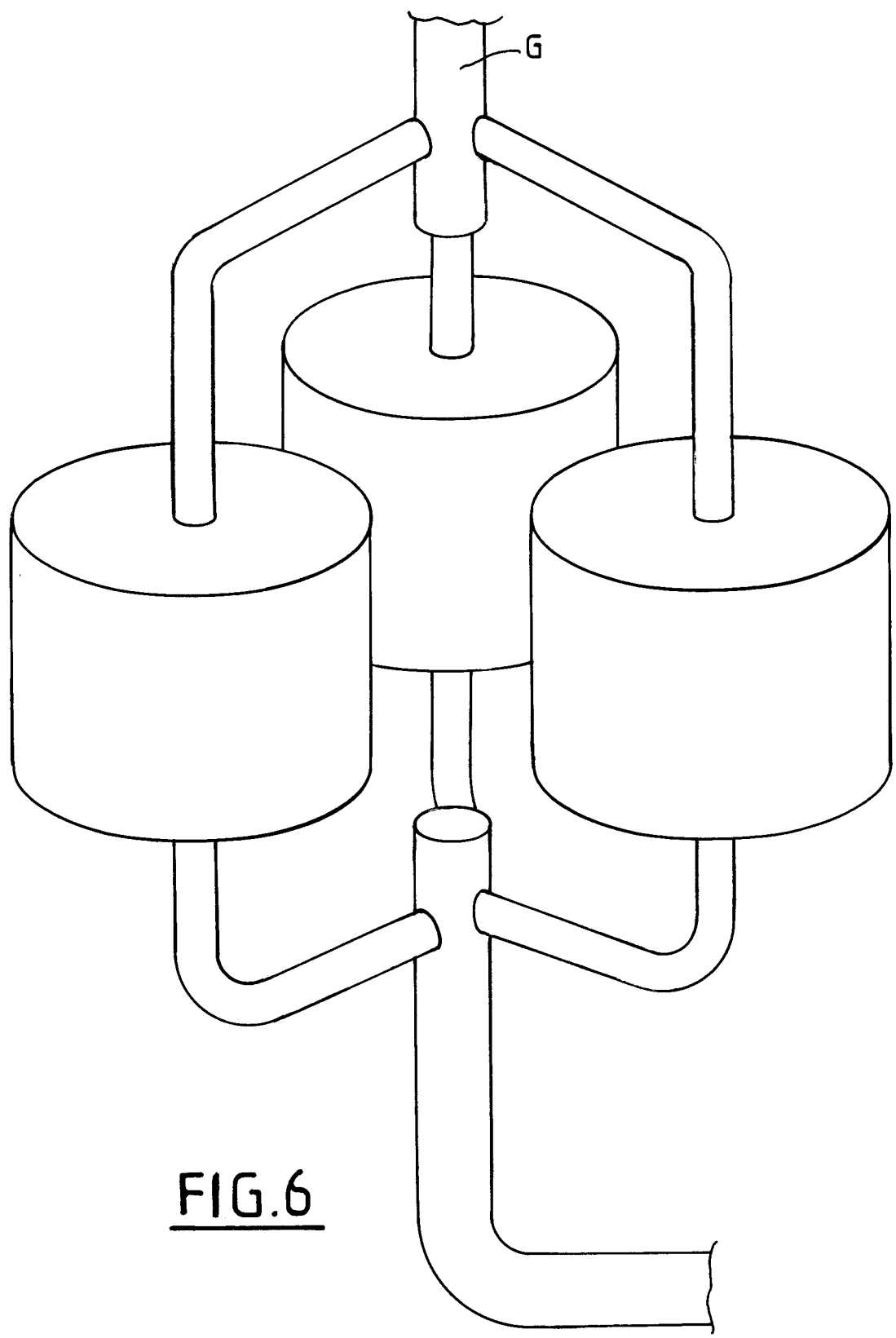
FIG. 6 is a schematic representation of a three-dimensional view of the 3 modules making up a cluster, in accordance with one embodiment of the present invention.

FIG. 6 is a 3-dimensional view of the 3 modules that make up the cluster. On the inlet side, in the lower part, the 3 nozzles are connected to the common inlet manifold. The latter has a straight length of the order of 5 times the diameter before heading off perpendicularly via an elbow. The diameter of the nozzle is 200 or 250 mm, depending on the model, and the diameter of the common manifold is 400 or 450 mm. The three nozzles are connected at the same level, at 120° C. from one another, and are geometrically identical. The arrangement of the nozzles on the production side, in the upper part, is identical, with nozzles of diameter 150 or 200 mm, and a 300 mm common manifold, A system G of the static mixer (or packing) type is provided in order to eliminate the effects that a nearby tee (not depicted) has on the flow. The axes of the straight parts of the manifolds are aligned and the inlets and outlets of the modules, for reasons of symmetry, are on circles of the same radius. The velocities of the flow of gases in the various pipes will range from 15 to around 50 m/s, as the case may be. It may be seen that the cluster used here follows exactly the same principle as one of the clusters of FIG. 5.

Figure 7:
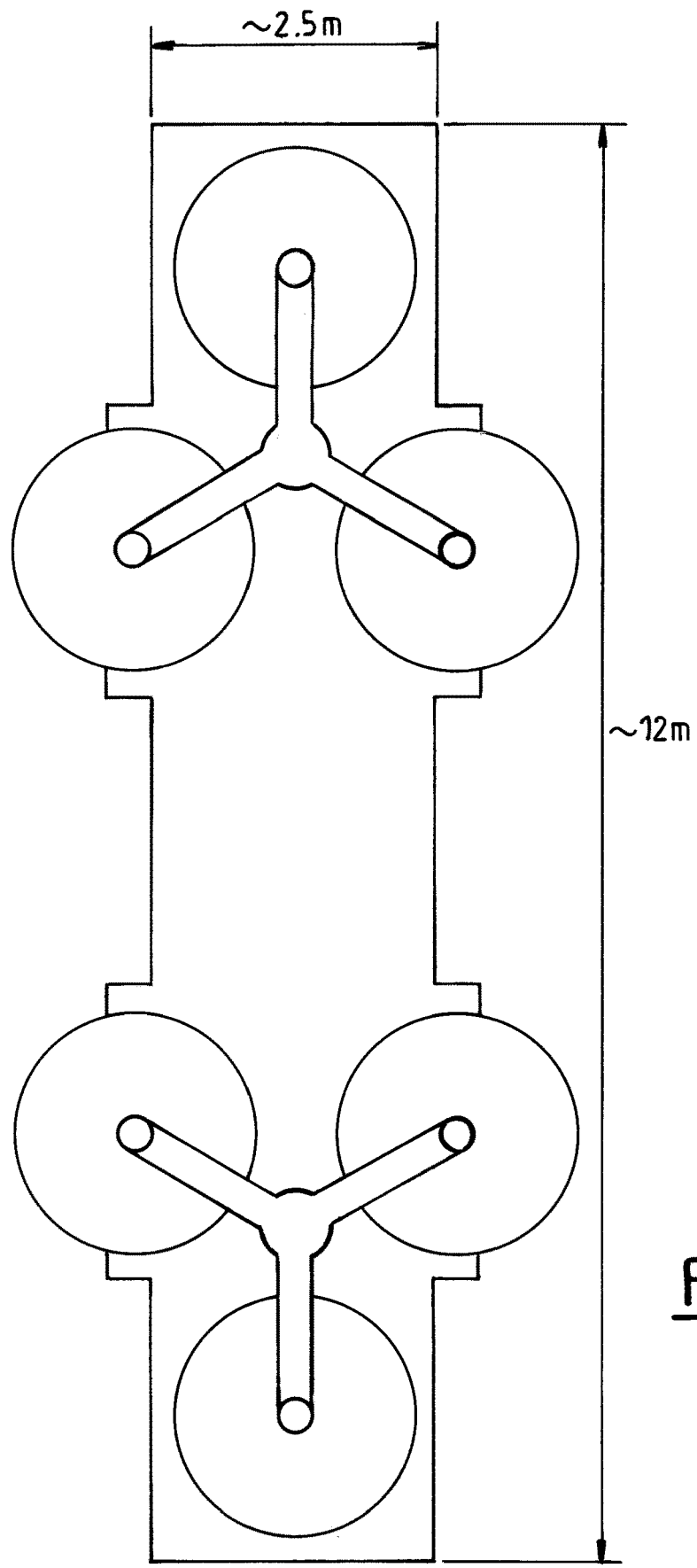
FIG. 7 is a schematic representation of a partial view of the unit from above, accordance with one embodiment of the present invention

FIG. 7 is a partial view of the unit from above, showing the 2 clusters of 3 modules with their nozzles, positioned on a standard metallic structure approximately 12 meters long by 2.5 meters wide, containing most of the piping and valves of the unit and which can be transported as-is. The machines not depicted in FIG. 7, namely air compressor and vacuum pump, are positioned outside the structure, in the continuation of the major axis thereof, A support system that locally extends the metallic structure is added to the upper part in order to securely hold 2 of the support legs of the 4 modules installed in partially cantilever fashion. For each cluster, the differences between the branches that separate or bring together the fluids are minimal and essentially caused by the presence of elbows or tees on the common manifolds or by the presence of welded seams of greater or lesser thickness. Calculations using conventional pressure-drop formulae and/or using fluid mechanics simulations covering the modules with their internals (distributor, adsorbent material, retention system, etc.) show that through the precautions listed hereinabove regarding the manufacture, particularly the packing and installation, the distribution between modules can be at least as good as the distribution within the radial adsorbers used in this type of process for over a decade.

It is therefore entirely possible to employ clusters of modules in place of a larger-sized adsorber without the need to install, between modules, more complex and more expensive equalizing systems which, if poorly set up as a result, for example, of a drift in the instrumentation, could act counter to the desired effect.

An industrial embodiment corresponding to an 02 MPSA unit of intermediate size has been considered by way of example, but it will be appreciated that the principle of the invention can be applied to clusters comprising more modules, to adsorbers comprising for example 2 clusters of 3 modules. One possible solution in this case is to keep the configuration of FIG. 7 for one adsorber, another identical element being installed in parallel, with the machines being positioned between the two structures. There is a great deal of flexibility around installation provided that symmetry is adhered to with respect to the modules and with respect to the various clusters that make up an adsorber. With just one single geometry for the modules, it is possible to cover an entire production range extending, for example in the case of O2 MPSA, from 15 to 120 tonnes of oxygen per day. It can therefore be appreciated that the mass-production effect plays a significant part in reducing costs.

The invention will advantageously apply to O2 VSA and MPSA, to CO2 or CO PSA (in the broad sense), these processes generally having a low pressure close to atmospheric pressure and very often lower than the latter. It can be used more generally where there is a wish to reduce dead volumes or head-losses while at the same time ensuring good distribution of the fluids through the absorbent masses. The number of adsorbers employed will depend on the envisioned separation, and especially on the complexity of the pressure cycle involved. In the case of the above-mentioned separations, this number will preferably remain less than or equal to 4 for the production of oxygen, 6/8 for the production of CO, and 8/12 for the capture of CO2. The number of clusters and of modules per cluster will essentially depend on the throughput of charge gas and on the size adopted for the modules. In general, use will be made of 1 to 6 clusters per adsorber and of 2 to 6 modules per cluster.

The dimensions of the modules will generally be limited by transportation at the upper end of the scale and by economic considerations at the bottom end (several small adsorbers to be compared with one medium-sized adsorber). Other criteria not mentioned here may favor the choice of several small adsorbers (namely clusters of N modules): evolution of unit throughput over time by adding modules, periodic module change-out if modules become contaminated. A broad range of possible dimensions for these modules is anticipated, for example a diameter of 0.4 to 2.5 meters and a height of 0.4 to 5 m, for volumes ranging from around 50 liters to 25 m$^3$.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A unit for purifying a gas mixture by adsorption, comprising at least one adsorber comprising at least one cluster of N identical adsorbent modules operating in parallel, where N≥2, each cluster of N adsorbent modules comprising:
- a common inlet manifold comprising a straight inlet duct of axis Xe supplying N inlet nozzles Tei, where i ranges from 1 to N, respectively connected to inlets Ei, where i ranges from 1 to N, of the N modules of said cluster,
- a common outlet manifold comprising a straight outlet duct of axis Xs collecting the flow leaving N outlet nozzles Tsi, where i ranges from 1 to N, respectively connected to outlets Si, where i ranges from 1 to N, of the N modules of said cluster, wherein:
the axes Xe and Xs are substantially coincident,
the N inlets Ei of the N modules are substantially situated on a first circle centered on the axis Xe or Xs,
the N outlets Si of the N modules are substantially situated on a second circle centered on the axis Xe or Xs,
the N inlet nozzles Tei are of substantially identical geometries, and
the N outlet nozzles Tsi are of substantially identical geometries, wherein the unit is a unit of the O2 VSA or O2 MPSA type comprising 1 to 4 adsorbers comprising 1 to 4 clusters of 3 to 6 modules.

2. A unit for purifying a as mixture by adsorption, comprising at least one adsorber comprising at least one cluster of N identical adsorbent modules operating in parallel, where N≥2, each cluster of N adsorbent modules comprising:
- a common inlet manifold comprising a straight inlet duct of axis Xe supplying N inlet nozzles Tei, where i ranges from 1 to N, respectively connected to inlets Ei, where i ranges from 1 to N, of the N modules of said cluster,
- a common outlet manifold comprising a straight outlet duct of axis Xs collecting the flow leaving N outlet nozzles Tsi, where i ranges from 1 to N, respectively connected to outlets Si, where i ranges from 1 to N, of the N modules of said cluster, wherein:
the axes Xe and Xs are substantially coincident.
the N inlets Ei of the N modules are substantially situated on a first circle centered on the axis Xe or Xs,
the N outlets Si of the N modules are substantially situated on a second circle centered on the axis Xe or Xs,
the N inlet nozzles Tei are of substantially identical geometries, and the N outlet nozzles Tsi are of substantially identical geometries,
wherein the unit is a unit of the CO VSA or CO MPSA type comprising 1 to 8 adsorbers comprising 1 to 4 clusters of 3 to 6 modules.

* * * * *